US012606227B2

(12) United States Patent (10) Patent No.: US 12,606,227 B2

Yuan (45) Date of Patent: Apr. 21, 2026

(54) MOTORIZED ATTACHMENT FOR PULLED WAGONS

(71) Applicant: Louis TanChing Yuan, Norcross, GA (US)

(72) Inventor: Louis TanChing Yuan, Norcross, GA (US)

( * ) Notice: Subject to any disclaimer, the term of this patent is extended or adjusted under 35 U.S.C. 154(b) by 436 days.

(21) Appl. No.: 18/195,927

(22) Filed: May 30, 2023

(65) Prior Publication Data

US 2024/0400122 A1    Dec. 5, 2024

(51) Int. Cl.
  B62B 5/00          (2006.01)
(52) U.S. Cl.
  CPC ............ B62B 5/005 (2013.01); B62B 5/0053 (2013.01); B62B 5/0069 (2013.01); B62B 2301/20 (2013.01)
(58) Field of Classification Search
  CPC ...................................................... B62B 5/005
  USPC ...................................................... 180/11–13
  See application file for complete search history.

(56) References Cited

U.S. PATENT DOCUMENTS 8,297,384 B2 *  10/2012  Wanger ................. B62K 27/003
                                                             180/11
9,796,401 B1 *  10/2017  Ammirati ............... B62B 5/005

11,642,256 B2 *   5/2023  Menig .................... A61G 5/047
                                                             180/13
11,845,484 B2 *  12/2023  Wercholuk .............. B62B 5/005
2007/0131461 A1 *   6/2007  Treadwell .............. B62D 51/06
                                                             180/19.1

FOREIGN PATENT DOCUMENTS

CN        106428165 A  *  2/2017  .............. B62B 5/06
KR        102551457 B1 *  7/2023  ........... B62B 5/0069
WO   WO-2008044541 A1 *  4/2008  .......... A61G 5/128
WO   WO-2024263169 A1 * 12/2024  .......... B62B 5/0053

* cited by examiner

*Primary Examiner* — Kevin Hurley
(74) *Attorney, Agent, or Firm* — Arthur T. Yuan

(57)            ABSTRACT

A motorized attachment to a utility wagon is provided. In one aspect, the attachment may include at least an adjustable frame for attaching to the wagon. In another aspect, the frame supports a power source, which may be disposed below the frame or above the frame. The frame, in a further embodiment, may further attach to a motor coupled or encased in a driving wheel. In one embodiment, the driving wheel may be disposed or positioned between the two existing front wheels of the wagon. In a further example, the driving wheel may include a tire with about 4" to 6" (in width) deep treated tire. The attachment may further include a control or a trigger to energize the motor and the driving wheel so that it provides the needed motion to assist the wagon.

18 Claims, 4 Drawing Sheets

PRIOR ART

MOTORIZED ATTACHMENT FOR PULLED WAGONS

FIELD OF THE INVENTION

Embodiments of the invention generally relate to assisted attachments. In particular, aspects of the invention relate to motorized attachments to originally non-motorized utility wagons.

BACKGROUND

Dolly, cart, wheel barrel, or other wheeled transportation devices have been used by humans for centuries. These devices provide convenience and ease when motorized vehicles cannot reach places, and when it is too burdensome for humans to carry objects, whether due to their quantities or weight, on backpacks, bags, or other containers. FIGS. 1 and 2 illustrate one of the latest creations of collapsible wheeled containers or wagons 100 that has been used by consumers around the world. The wagon has been used in various occasions, including outdoor events, camping, or the like. Due to the collapsible construction, they can also easily carried in a car to different destinations. Parents have also used these to carry their young children or pets in the park.

While the wagon 100 shown in FIGS. 1 and 2 have the benefits identified above, one of the main disadvantages is that it is not motorized. Due to this disadvantages, there are versions of the wagon that is motorized. However, this would require the consumer to abandon the existing wagon and purchase a new motorized version. In addition, the motorized version is not collapsible, making it difficult to carry.

SUMMARY OF THE INVENTION

Aspects of the invention overcome the prior drawbacks of the prior art by creating a motorized attachment to the existing collapsible wagon. In one aspect, the attachment may include at least an adjustable frame for attaching to the wagon. In another aspect, the frame supports a power source, which may be disposed below the frame or above the frame. The frame, in a further embodiment, may further attach to a motor coupled or encased in a driving wheel. In one embodiment, the driving wheel may be disposed or positioned between the two existing front wheels of the wagon. In a further example, the driving wheel may include a tire with about 4" to 6" (in width) deep treated tire. The attachment may further include a control or a trigger to energize the motor and the driving wheel so that it provides the needed motion to assist the wagon.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 6 and 7 are top views of the motorized attachment according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 2:
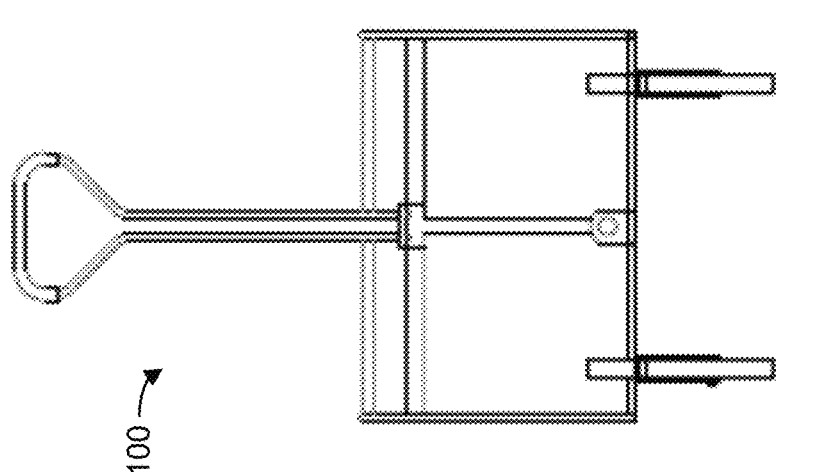
FIG. 2 is a diagram of a front view of the existing utility wagon of FIG. 1.
Figure 1:
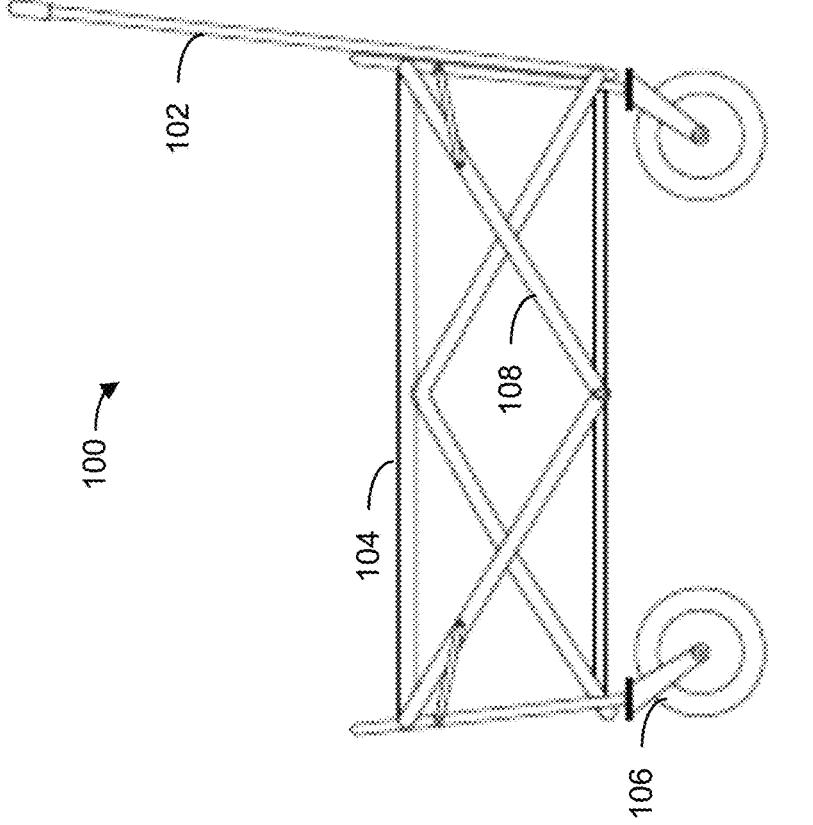
FIG. 1 is a diagram of a side view of an existing utility wagon.

Referring now to FIGS. 1 and 2, diagrams showing an existing load carrying device or a utility wagon (hereinafter "wagon") 100. In one example, the wagon 100 is a manually pulled device without inherent or assisted electrical power in this movement. In another example, the wagon 100 typically includes a handle 102, a container or basket 104 for carrying load, a set of four wheels 106, and a frame 108 for supporting the container, the handle, and the set of wheels. FIG. 1 is a side view of the wagon 100 and FIG. 2 is a front view of the wagon 100.

Figures 3, 4:
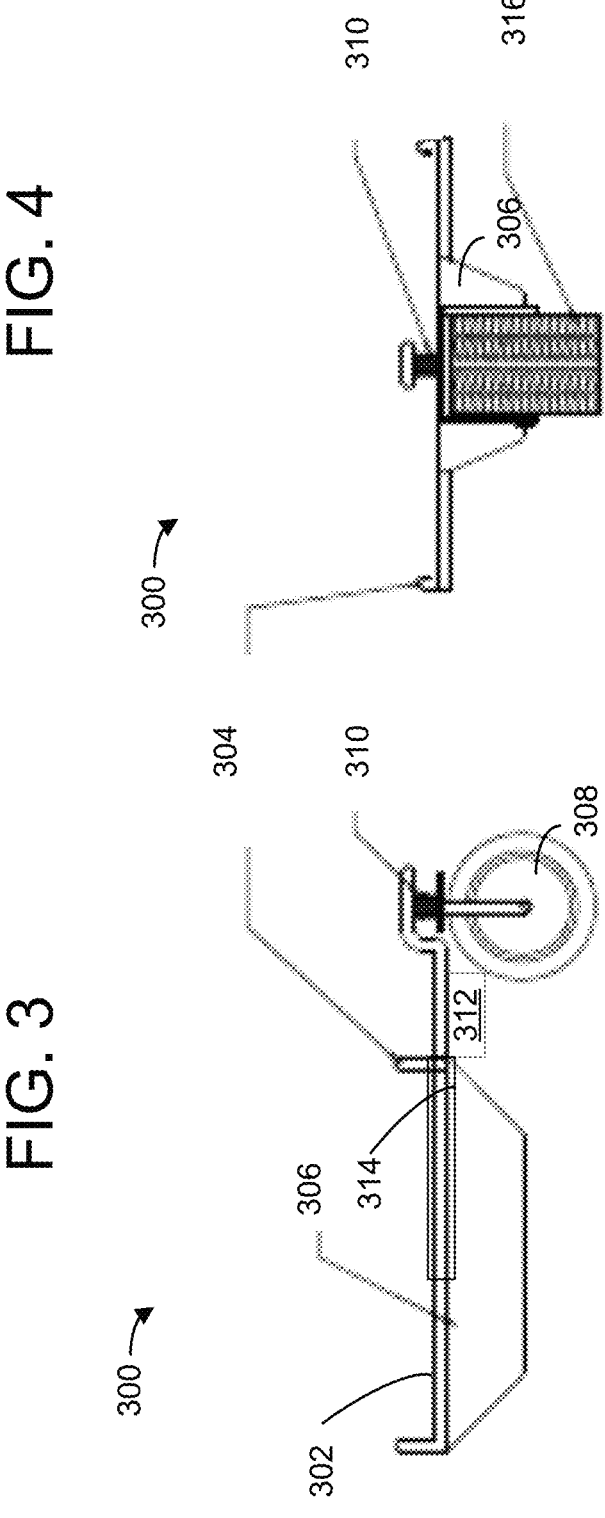
FIG. 3 is a diagram of a side view of a motorized attachment according to one embodiment.
FIG. 4 is a first diagram of a front view of the motorized attachment according to one embodiment.
Figure 5:
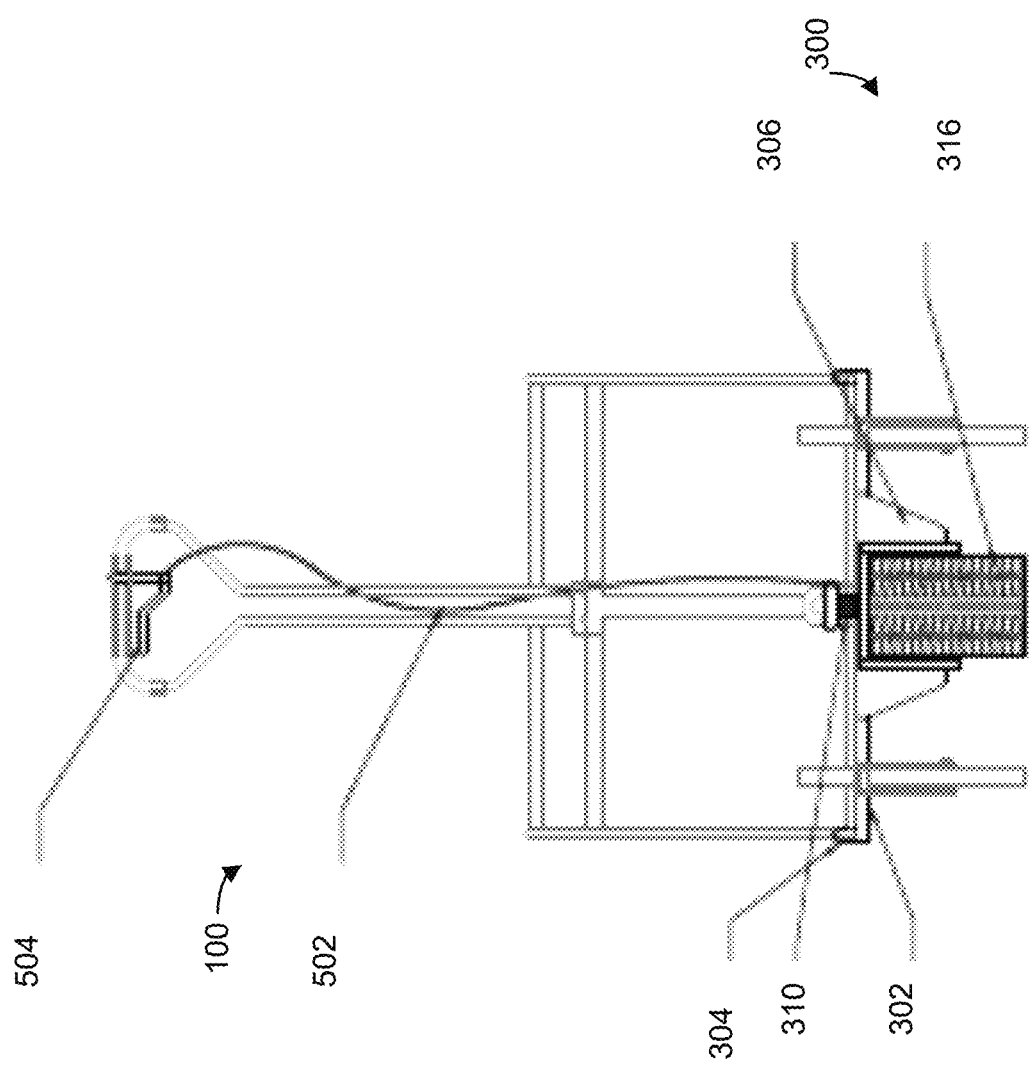
FIG. 5 is a second diagram of another front view of the motorized attachment according to one embodiment.
Figures 6, 7:
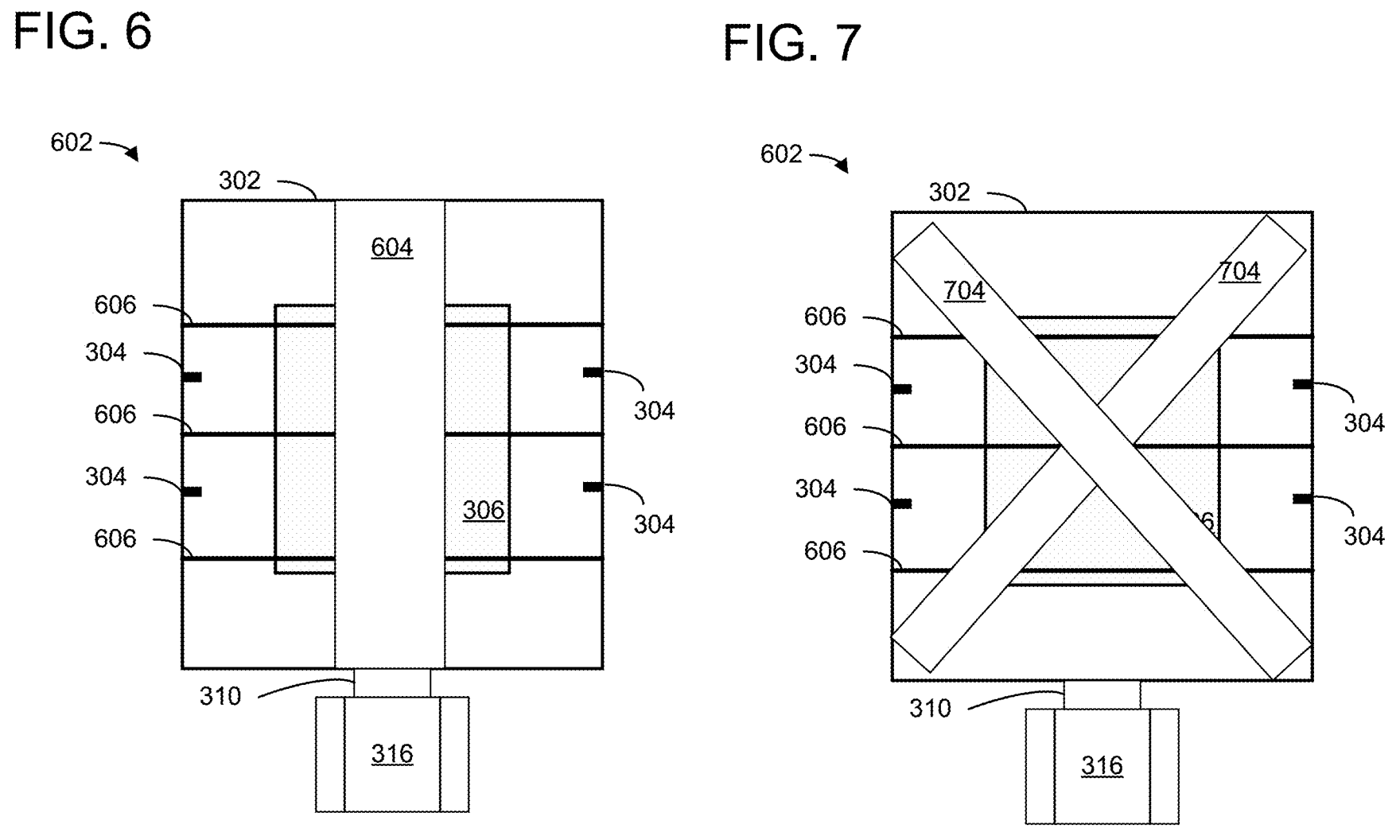

Referring now to FIGS. 3 to 5, diagrams illustrate different views of a motorized attachment 300 according to one embodiment. In one aspect, FIG. 3 illustrates a side view of the attachment 300; FIG. 4 is a front view of the attachment 300; FIG. 5 is another front view of the attachment 300 with additional elements; and FIGS. 6 and 7 are top views of the attachment 300. In one embodiment, the attachment 300 may include a main frame 302. In one embodiment, the main frame 302 may include a skeleton 602. In one embodiment, the skeleton 602 may include one or more elements, such as a central main element 604, and a set of cross elements 606. In another embodiment, the skeleton 602 may be arranged in a number of ways. For example, as shown in FIG. 6, the skeleton 602 is arranged in a x- and y-axis manner with the central main element 604 in the y-axis and one or more cross elements in the horizontal or laterally, or along the x-axis. In another embodiment, the skeleton 602 may be disposed in a diagonal manner 704, as shown in FIG. 7. It is to be understood that the skeleton 602 may be arranged in a number of manner or a combination of aforementioned approaches without departing from the scope or motivation of the invention.

In another embodiment, the main frame 302 further may include one or more attachment hooks 304 for attaching to the frame 108. In one embodiment, the hooks 304 may be positioned along the skeleton 602. For example, as depicted, the hooks 304 may be positioned along the outermost frames of the skeleton 602. In another embodiment, the hooks 304 may be stationary, or welded to the skeleton 602. In another embodiment, the hooks 304 may be slidable along the skeleton 602 to accommodate various sizes or positions of the frame 108 of the wagon 100. In another embodiment, the main frame 302 may provide an extendable arm 314 that connects to the skeleton 602 and the one or more hooks 304 for enabling the hooks 304 to attach to the frame 602. In one example, the attachment hooks 304 may be metallic hooks. In another embodiment, the attachment hooks 304 may be hook-and-loop system for tying or securing the skeleton 602 to the frame 108. It is to be understood that other attachment means, such as magnetic snap button, looped buttons, zip ties, or the like may be used without departing from the scope or motivation of the invention.

In another embodiment, the main frame 302 may include a power source 306. In one example, the power source 306 may be a battery pack that includes a set of batteries or power sources. For example, the power source 306 may include lithium ion power sources or capacitors within a protective casing or sleeve. In one example, the power source 306 may be coupled to or engaged with the main frame 302. For example, the power source 306 may be attached or mounted to the main frame 302. In one example, the power source 306 may be disposed in a center location of the main frame. In another embodiment, the power source 306 may be disposed below the basket 104.

In one aspect, the power source 306 may include one or more battery units or modules that may be distributed along the main frame 302. For example, the individual battery units or modules may be in a cylindrical or bar shape, instead of a cuboid. As such, depending on the design of the main frame 302, the power source 306 may have battery units or modules positioned along or underneath the skeleton 604 and each of the units or modules are connected via wires. In one aspect, such design may enable backup unit(s) to be placed along the main frame 302.

In one aspect, the power source 306 may provide electrical energy to a control 312 before the control 312 actuates the electrical power to a motor 308. In one embodiment, the motor 308 may be a propulsion device, such as an in-wheel hub motor with or without regenerative braking capabilities, for example. The motor 308 may be coupled to a wheel/tire assemblies 316 of the main frame 302, and configured to drive the main frame 302. As such, once attached, the wheel 316 with the motor 308 becomes the driving wheel and the fifth wheel for the overall connected motorized wagon.

In one aspect, the wheel 316 may include a solid tire designed for rough terrain capabilities. In another embodiment, the wheel 316 may include a 4" to 6" deep thread tire. In another embodiment, the tire for the wheel 316 may include grooves or tire patterns that increase or enhance tractions with the ground. It is to be understood that other configurations of tires may be used without departing from the scope or motivation of the invention.

In another embodiment, the wheel 316 and the motor 308 may be disposed between the two wheels 106 of the wagon

100. In one example, as shown in FIG. 5, the wheel 316 is centrally disposed between the two front wheels of the wagon 100. Such positioning ensures the maximum stability and torque when assisting the user in pulling the wagon 100.

In one aspect, the power source 306 may be in communication with the control 312 that actuates or operates to regulate the flow of energy to and from the motor 308. In one aspect, the control 312 may be located near the front of the main frame 302 or in close proximity to the power source 306. In one aspect, where the motor 308 may be in-wheel hub motor with regenerative braking, an inverter (not shown) may commutate the flow of current depending on whether the attachment 300 may be accelerating or decelerating via braking. In one aspect, this allows energy that is typically wasted to be recovered and stored in power source 306. In another embodiment, where the motor 302 may be without regenerative braking capabilities, an inverter may also be included in an electric circuitry of the power source 306 to change the current from a direct current (DC) power source 306 to the motor 308 designed to run on alternating current (AC).

In a further embodiment, the power source 306 may be chargeable by connecting a cable to an AC power source.

In one aspect, the control 312 may include a processor or a microprocessor with electrical circuitry regulating or operating the electrical power from the power source 306. In another aspect, the control 312 may further include an actuator 504 connected via a connection 502. In one embodiment, the actuator 504 may include a handle and a trigger for accelerating or decelerating. In another embodiment, the connect 502 may include a wire connecting the control 312 to the actuator 504.

In another embodiment, the power source 306 may provide a display for displaying power capacity levels of the power source 306. In another embodiment, the control 312 may include a wireless module for transmitting information such as the power capacity levels of the power source 306. In yet another embodiment, the wireless module may couple with an app or a piece of software installed on a mobile phone so that the app may receive or process the information from the wireless module. In one example, the wireless module may include a wireless chip capable of transmitting information via wireless standards, such as the communication may be wireless such as through Wi-Fi® (802.11 standard), BLUETOOTH, cellular communication, or near field communication (NFC) devices. Similarly, the mobile phone may be equipped with the similar wireless chip for receiving such information, having either the aforementioned app installed or having built-in interface software installed so that the information may be presented or provided to the user.

Optionally, the handle may be coupled with a display for displaying the information from the wireless module.

In yet another embodiment, the attachment 300 may include a spring connection 310 disposed between the driving wheel 316 and the main frame 302. In one aspect, the spring connection 310 may include a spring or similar device to reduce the vibration or absorb vibration experienced by the wheel 316. In a further aspect, the spring connection 310 may provide a downward force for enhancing or elevating friction force or traction between the driving wheel 316 and the ground so that the driving wheel 316 has the adequate traction with the ground.

In one embodiment, the attachment 300 may be foldable so as to reduce the overall size and be accommodating to the wagon 100.

Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, aspects of the invention provide an enhanced motorized attachment to the existing utility wagon.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A motorized apparatus for a utility wagon comprising:
a main frame for attaching to a body of the utility wagon;
a power source attached to the main frame or the body;
a motor coupled to a driving wheel, wherein the driving wheel is disposed on the main frame and adjacent to a handle of the utility wagon;
a spring connection disposed between the driving wheel and a front end of the main frame;
wherein the power source provides electrical power to the motor; and
a control for energizing the motor to drive the driving wheel.

2. The motorized apparatus of claim 1, wherein the main frame comprises one or more attachment hooks for attaching the main frame to a frame of the body of the utility wagon.

3. The motorized apparatus of claim 1, wherein the power source is disposed in a center position of the main frame.

4. The motorized apparatus of claim 1, wherein the driving wheel is disposed between front wheels of the utility wagon.

5. The motorized apparatus of claim 1, wherein the control comprises a wired cable for connecting to a trigger for controlling a speed of the motor.

6. The motorized apparatus of claim 5, wherein the trigger is attached to the handle of the utility wagon.

7. The motorized apparatus of claim 1, wherein the control comprises a wireless module for transmitting or receiving wireless signals.

8. The motorized apparatus of claim 2, wherein the main frame comprises at least one extendable arm for positioning the one or more attachment hooks to attach to different positions of the body of the utility wagon.

9. An add-on motorized apparatus for a load carrying device comprising:
a main frame for attaching to a body of the load carrying device, wherein the main frame is disposed below the body of the load carrying device;
a power source attached to the main frame or the body;
a motor coupled to a driving wheel, wherein the driving wheel is disposed at a front end of the main frame and adjacent to a handle of the load carrying device, wherein the motor comprises an in-wheel hub motor;
a spring connection is disposed between the driving wheel and a front end of the main frame;
wherein the power source provides electrical power to the motor; and
a control for actuating the electrical power provided to the motor to drive the driving wheel.

10. The add-on motorized apparatus of claim 9, wherein the main frame comprises one or more attachment hooks for attaching the main frame to a frame of the body of the load carrying device.

11. The add-on motorized apparatus of claim 9, wherein the power source is disposed in a center position of the main frame to lower the center of gravity of the load carrying device.

12. The add-on motorized apparatus of claim 9, wherein the driving wheel is disposed between front wheels of the load carrying device.

13. The add-on motorized apparatus of claim 9, wherein the control comprises a wired cable for connecting to a trigger for controlling a speed of the motor.

14. The add-on motorized apparatus of claim 13, wherein the trigger is attached to the handle of the load carrying device.

15. The add-on motorized apparatus of claim 9, wherein the control comprises a wireless module for transmitting or receiving wireless signals.

16. The add-on motorized apparatus of claim 10, wherein the main frame comprises at least one extendable arm for positioning the one or more attachment hooks to attach to different positions of the body of the load carrying device.

17. A motorized utility wagon comprising:
a main frame for attaching to a body of a utility wagon;
a power source attached to the main frame or the body;
a motor engaging with a driving wheel, wherein the driving wheel is disposed on the main frame and adjacent to a handle of the utility wagon;
a spring connection disposed at the driving wheel and a front end of the main frame;
wherein the power source provides electrical power to the motor; and
a control for energizing the motor to drive the driving wheel.

18. The motorized utility wagon of claim 17, wherein the control comprises a wireless module for transmitting or receiving wireless signals.

* * * * *